United States Patent [19]
Parks

[11] Patent Number: 5,354,111
[45] Date of Patent: Oct. 11, 1994

[54] DISH TRANSPORT APPARATUS WITH DUAL POSITIONABLE HANDLES

[76] Inventor: Charles S. Parks, P.O. Box 127, Greenwood, Del. 19950

[21] Appl. No.: 102,247

[22] Filed: Aug. 5, 1993

[51] Int. Cl.$^5$ .......................... A47J 45/10; A45F 5/00
[52] U.S. Cl. .................. 294/27.1; 294/144; 294/169
[58] Field of Search ............... 294/16, 27.1, 28, 32, 294/137, 141, 142, 144, 165, 167, 169, 172

[56] References Cited

U.S. PATENT DOCUMENTS

| | | | |
|---|---|---|---|
| 2,078,650 | 4/1937 | Clark | 294/161 X |
| 2,723,068 | 11/1955 | Ettwein | 294/144 |
| 2,892,578 | 6/1959 | Sickrey | 294/167 X |
| 3,128,022 | 4/1964 | Mastrud, Jr. | 294/167 X |
| 3,194,460 | 7/1965 | Tupper | 294/32 X |
| 3,359,946 | 12/1967 | Schluttig | 294/169 X |
| 3,934,772 | 1/1976 | Brannan | 294/169 |

FOREIGN PATENT DOCUMENTS

| | | | |
|---|---|---|---|
| 41967 | 3/1930 | Denmark | 294/169 |
| 669677 | 12/1938 | Fed. Rep. of Germany | 294/169 |

*Primary Examiner*—Dean J. Kramer
*Attorney, Agent, or Firm*—John P. Halvonik

[57] ABSTRACT

The invention is a dish transport apparatus with dual positionable handles. The invention comprises at least one movable handle having a pair of handle arms in pivotal connection with pivot pins located on the sides of a base member. The handles are connected to the base by means of slots in each arm thus allowing the gripping portion of the handle to be placed at a lowered, "loading" position in channels located at the front and/or the rear of each base member. From this position, the dish may be placed on the base. The handle is then pivoted upward and locked into a second upward position for transport. The handles may be pivoted against a spring biasing member to lock them into place in the loading position.

2 Claims, 1 Drawing Sheet

DISH TRANSPORT APPARATUS WITH DUAL POSITIONABLE HANDLES

BACKGROUND AND PRIOR ART

It is believed that the invention will find its primary utility in transporting plates and dishes when they are hot and difficult to handle. In the apparatus described here, the dish is placed upon the top surfaces of the cross members and the upper surface of each base member, the handle(s) being locked into place in a lowered position. This places the handles in position where they will not interfere with the loading of the dish. The handles are then pivoted upward into place where they are used to transport the hot dish. The apparatus may also find usefulness transporting cold dishes or other types of articles.

While there are support members for the transport of hot plate (e.g. U.S. Pat. No. 2,078,650 to Clark) this does not have a dual positionable handle as the applicant's invention. It is believed that there are no devices in the prior art with similar construction of a transport member with a handle for positioning out of the way during the loading of the dish onto the apparatus.

SUMMARY OF THE INVENTION

The invention is a hot dish transport apparatus comprising a base member and at least one support handle pivotally connected at one end of the base member. The base portions are connected in parallel fashion by front and rear cross members. Each base portion may have channels cut in the front and possibly in the rear of each in order to secure the gripping portion of the handle to the base members in a lowered position.

Each handle has a pair of arms that connect with the base by means of an angled slot in the arm and a pivot member at the side of each base member. The slot allows the handle to be lowered downward and locked into this loading position. When the plate is loaded onto the base, the arms are pulled downward and outward in order to free them from the channel and allow them to be pivoted upward and above the base member for carrying the apparatus.

It is an object of the invention to provide a carrying member to enable one to carry baking dishes that are hot by hand.

Another objective of the invention is to provide a carrying apparatus whose handles may be secured into two positions—a downward position out of the way of loading of the dish and an upward position for use in carrying the dish.

Another objective is to provide a dish transporting apparatus with handles that may be locked into a secure position for safe lifting, handling and/or moving of the apparatus.

Another objective is to provide a handled transporting apparatus that may be carried with one hand to allow the other freedom to do other things.

Another objective is to provide a handled transporting apparatus whose handles may be locked into place at one end in a position below the area where a hot dish is being loaded and also so that the handles are out of the way when handling the dish at the table.

Other objectives will become known to those skilled in the art once the invention is shown and described.

DESCRIPTION OF THE PREFERRED EMBODIMENT

Figure 1:
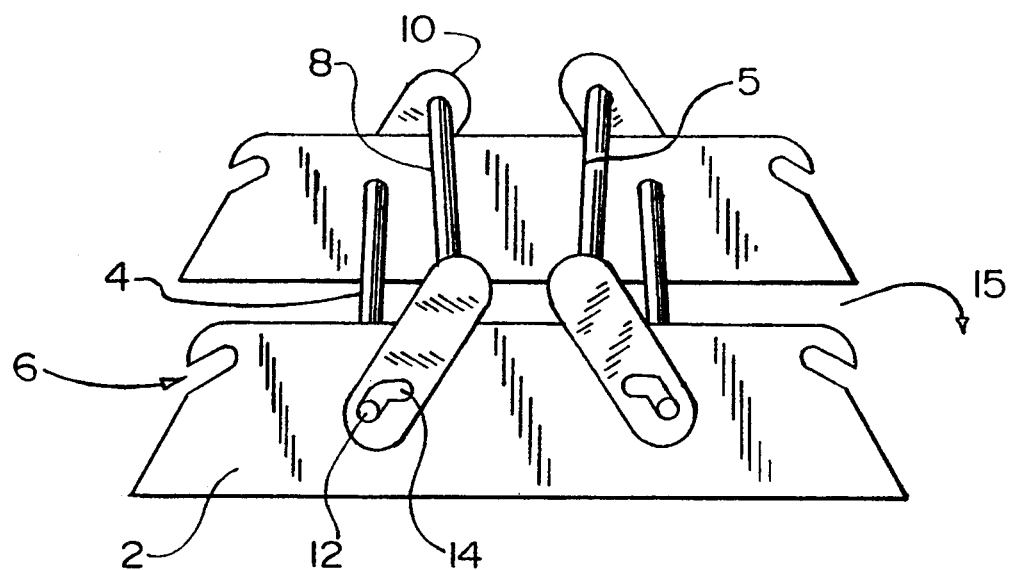
FIG. 1 Apparatus with handles upward for transport.

The invention is shown with handles in carrying position in FIG. 1. The base is comprised of left and right base members 2. Cross members 4 connect the base members to one another in parallel fashion. Dishes rest upon the cross members and the upper edges of the base members for transport.

At least one handle (comprised of gripping portion 8 and handle arm 10) is attached to the base member 2 by the handle arms 10 in connection with a pivot pin 12 through a slot 14 in the side of the each arm. When two handles are used there is a second set of slots at the rear of each base member. The pivot pin is located on the outside of the base portion. The cross members 4 will be in close connection with the gripping portion 8 of the handle when the handle is in the lowered, "loading" position.

The gripping portion is connected to the front of the base member by a pair of channels 6 which allow the gripping portion to rest in the channel and be secured by the action of the slot and the pin. The channels are in the front of the base member and also in the rear of each base member when two handles are used. The channels are preferably oriented downward so that the handle needs to be moved downward, see arrow 18, in order to release it from the channel.

A second handle and pair of connecting arms may also be used at the other end of the base member in connection with the rear cross member 5. They would move and lock in the same manner as the first handle. It is preferred that two handles be used.

Pivot pins 12 are located in the outer side of each base member. An angled slot 14 is located in each arm. To load the apparatus with a dish, the handle is lowered, see arrow 15, to a level with the channel, see FIG. 2. Then the handle is moved upward into the channel, see arrow 16, to lock into the loading position, see FIG. 3. At the same time, the front portion of the slot will come to rest against the pivot pin as shown in FIG. 3 to lock the handles into a secure position.

Figure 2:
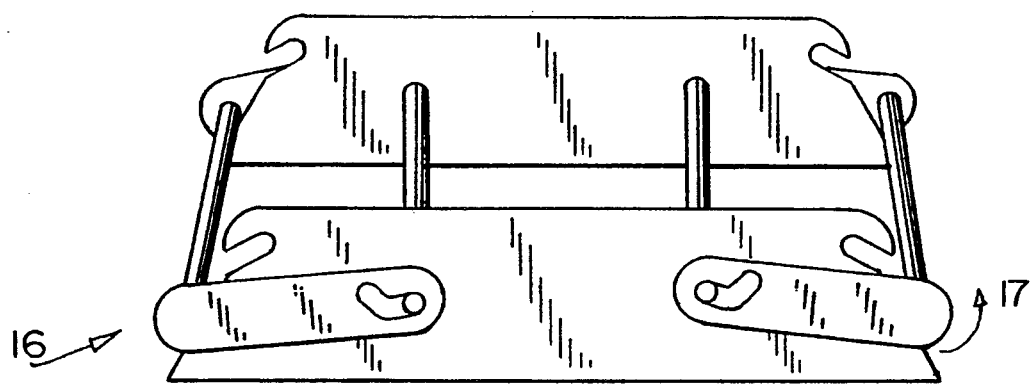
FIG. 2 Apparatus with handles down prior to locking into place.
Figure 3:
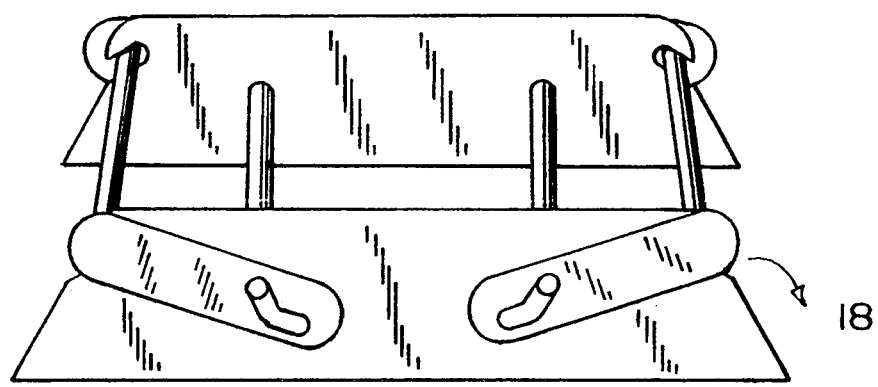
FIG. 3 Handles down and locked into place.

To go from the loading position to the carrying position, the handles are moved downward, see arrow 18, and the slot is pushed forward so that it is released from the pin, see FIG. 2. Then the handles are in position for upward movement, see arrow 17, to get into the position shown in FIG. 1 for transport.

It is preferred that the slot be angled, i.e. it is not straight but has a bend in it. In the loading position the pin is near the front of the slot, and when the handle is released the pin is near the rear of each slot as shown in FIG. 1. A spring may also be used to urge the slot back so that it rests with the pivot pin in the forward portion of the slot. With the handles in this lowered position, see FIG. 3, the dish may be loaded onto the cross members and the top of the base members.

I claim:

1. An apparatus for transport of articles comprising: a pair of base members each base member having outer and inner sides and a front and a rear face, front and rear cross members connected to said inner sides of each base members so that said inner sides face one another and said base members define a plane, a front and rear handle, each said handle comprising a gripping portion and a pair of arms in connection with said gripping portion, each of said arms in pivotal connection with said outer sides of said base members, each said base member having a front channel in connection with said front face and a rear channel in connection with said rear face, said channels having an axis along said front and rear faces and a lateral opening parallel to said axis in said front and rear faces so as to allow said gripping portions of said handles to be secured into said channels for placement about parallel to said plane of said base members and so that said handles may be removed from said channels for placement above said plane of said base members.

2. The apparatus of claim 1 wherein said base members each have a pivot pin extending from said outer sides, each of said arms having slots for sliding in connection with said pivot pins so that said handle may be pivoted along said pivot pins.

* * * * *